(12) United States Patent
Jau et al.

(10) Patent No.: US 11,260,595 B2
(45) Date of Patent: Mar. 1, 2022

(54) LIGHT-CURING 3D PRINTER CAPABLE OF QUICK PRINTING AND LIQUID-LEVEL SMOOTHING

(71) Applicants: XYZPRINTING, INC., New Taipei (TW); KINPO ELECTRONICS, INC., New Taipei (TW)

(72) Inventors: Wei-Chun Jau, New Taipei (TW); Tsung-Hua Kuo, New Taipei (TW); Hung-Peng Kang, New Taipei (TW); Yi-Tang Kao, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 215 days.

(21) Appl. No.: 16/730,194

(22) Filed: Dec. 30, 2019

(65) Prior Publication Data
US 2021/0016505 A1  Jan. 21, 2021

(30) Foreign Application Priority Data
Jul. 19, 2019 (CN) .......................... 201910655009.9

(51) Int. Cl.
*B29C 64/264* (2017.01)
*B29C 64/232* (2017.01)
(Continued)

(52) U.S. Cl.
CPC .......... *B29C 64/264* (2017.08); *B29C 64/232* (2017.08); *B29C 64/245* (2017.08);
(Continued)

(58) Field of Classification Search
CPC .................................................... B29C 64/255
See application file for complete search history.

(56) References Cited

U.S. PATENT DOCUMENTS 9,782,934 B2 * 10/2017 Willis ................... B29C 64/135
2002/0195748 A1 * 12/2002 Farnworth ............ B29C 64/135
264/401
(Continued)

FOREIGN PATENT DOCUMENTS

WO    2019140164 A1    7/2019

OTHER PUBLICATIONS

Search Report dated Jul. 3, 2020 of the corresponding European patent application.

*Primary Examiner* — Timothy Kennedy
(74) *Attorney, Agent, or Firm* — Chun-Ming Shih; HDLS IPR Services

(57) ABSTRACT

A light-curing 3D printer includes a main-tank, a printing platform, a lighting unit, a liquid material contained in the main-tank, an isolation fluid contained in the main-tank and floating upon the liquid material, a membrane arranged upon the isolation fluid, and an auxiliary mechanism. The 3D printer controls the lighting unit to emit light toward the liquid material according to slicing data of one cured-layer of a 3D model for forming a 3D object. The 3D printer then controls the printing platform to lower and activates the auxiliary mechanism to keep varying the status of the isolation fluid. Next, the 3D printer determines whether the 3D model is completed, and controls the lighting unit to emit light according to slicing data of a next cured-layer if the 3D model is not yet completed.

11 Claims, 13 Drawing Sheets

(51) Int. Cl.
*B29C 64/245* (2017.01)
*B29C 64/255* (2017.01)
*B29C 64/386* (2017.01)
*B29C 64/124* (2017.01)

(52) U.S. Cl.
CPC .......... *B29C 64/255* (2017.08); *B29C 64/386* (2017.08); *B29C 64/124* (2017.08)

(56) References Cited

U.S. PATENT DOCUMENTS

| | | | |
|---|---|---|---|
| 2009/0020901 A1* | 1/2009 | Schillen | B29C 64/153 |
| | | | 264/31 |
| 2013/0295212 A1* | 11/2013 | Chen | B29C 64/129 |
| | | | 425/150 |
| 2015/0309473 A1 | 10/2015 | Spadaccini et al. | |
| 2016/0303795 A1* | 10/2016 | Liu | B29C 64/25 |
| 2017/0113418 A1 | 4/2017 | Deotte et al. | |
| 2018/0009163 A1* | 1/2018 | Craven | B29C 64/255 |

\* cited by examiner

LIGHT-CURING 3D PRINTER CAPABLE OF QUICK PRINTING AND LIQUID-LEVEL SMOOTHING

BACKGROUND OF THE INVENTION

1. Technical Field

The technical field relates to a light-curing 3D printer, and specifically relates to a light-curing 3D printer which is capable of quick printing and liquid-level smoothing.

2. Description of Related Art

According to the maturity of 3D printing technology, and the narrowed volume and reduced price of the 3D printers, the utilization of the 3D printers has become popular these days.

The current 3D printers in the market are basically printing layer by layer, in other words, these types of 3D printers print a slicing object of one layer at a time, and stack multiple slicing objects of multiple layers to construct a physical 3D model.

Taking light-curing 3D printers for an instance, these light-curing 3D printers control a lighting unit to emit light toward liquid material inside a water tank according to a pattern associated to one layer. Then, these light-curing 3D printers continually execute above step for printing multiple slicing objects of multiple layers and stacking these slicing objects to construct a physical 3D model. However, there're some deficiencies that the current light-curing 3D printers must overcome.

FIG. 1 is a first schematic diagram of a light-curing 3D printer of related art. A 3D printer 1 shown in FIG. 1 includes a tank 11, a printing platform 12, a lighting unit 13, and a wiper 14, wherein an liquid material 10 is contained in the tank 11, the printing platform 12 is controlled to immerse in the liquid material 10, the lighting unit 13 is arranged upon the tank 11, and the wiper 14 is arranged aside the surface (i.e., the liquid-level) of the liquid material 10.

As shown in FIG. 1, the lighting unit 13 is controlled by the 3D printer 1 to emit light (such as laser beam) toward the liquid material 10 near the surface of the printing platform 12. A part of the liquid material 10 that is directly irradiated by the light emitted from the lighting unit 13 will be cured as a slicing object of one cured-layer. Next, the 3D printer 1 controls the printing platform 12 to lower to a height associated to next cured-layer, and then controls the lighting unit 13 to perform above emitting action for curing another slicing object of the next cured-layer. However, the declining of the printing platform 12 may cause the liquid material 10 to wave, so the liquid-level of the liquid material 10 will be un-smooth due to the movement of the printing platform 12.

For improving the printing quality, the 3D printer 1 controls the wiper 14 to wipe along the surface of the liquid material 10 for the liquid material 10 to smoothing its surface. Next, the 3D printer 1 controls the lighting unit 13 to perform the emitting action for the next cured-layer after the surface of the liquid material 10 becomes smooth due to the wiping of the wiper 14. However, the 3D printer 1 has to wait for the wiper 14 to move from one side of the tank 11 to another side of the tank 11 back and forth, so the printing time is extremely wasted.

In order to solve above problem, another 3D printer has also been announced to the market. FIG. 2 is a second schematic diagram of a light-curing 3D printer of related art.

A 3D printer 2 shown in FIG. 2 includes a tank 21, a printing platform 22, and a lighting unit 23, wherein a liquid material 20 is contained in the tank 21.

The difference between the 3D printer 2 and the 3D printer 1 of FIG. 1 is that the 3D printer 2 further includes a membrane 24 arranged at the top of the liquid material 20 to substitute for the wiper 14 of the 3D printer 1 as discussed with respect to FIG. 1. The arrangement of the membrane 24 creates a sealed space inside the tank 21 of the 3D printer 2. Due to the arrangement of the membrane 24, even if the printing platform 22 is controlled to lower after a slicing object is cured, the surface of the liquid material won't wave.

However, after the lighting unit 23 emits light toward the printing platform 22 and cures the liquid material 20, the cured slicing object will attach to the surface of the printing platform 22 as well as the bottom face of the membrane 24. In this scenario, the 3D printer 2 has to first control the printing platform 22 to lower to a certain height that the slicing object may be completely peeled from the bottom face of the membrane 24 after the slicing object is cured, and the 3D printer 2 is then able to control the printing platform 22 to rise to a printing height required by next cured-layer for the lighting unit 23 to perform the emitting action for the next cured-layer. In this manner, the 3D printer 2 has to waste a lot of time on the movement of the printing platform 22 for peeling, and the overall printing time of the 3D printer 2 is extremely increased.

Accordingly, the current light-curing 3D printers need to be applied with a creative printing approach for not only solving the wave of the liquid material and/or the peeling problem, but also reducing the overall printing time.

SUMMARY OF THE INVENTION

The disclosure is directed to a light-curing 3D printer capable of printing and liquid-level smoothing, which uses an auxiliary mechanism to vary the status of the isolation fluid upon the liquid material, so as to achieve the purpose of quick printing and smoothing liquid-level of the liquid material.

In one of the exemplary embodiments, the above 3D printer mainly includes a main-tank, a printing platform, a lighting unit, a liquid material contained in the main-tank, an isolation fluid contained in the main-tank and floating upon the liquid material, a membrane arranged on the isolation fluid, and an auxiliary mechanism. The 3D printer controls the lighting unit to emit light toward the liquid material according to a slicing data for forming a 3D object of one cured-layer. Then, the 3D printer controls the printing platform to lower and also controls the auxiliary mechanism at the same time for varying the status of the isolation fluid. Further, the 3D printer determines whether a desired 3D model is completely formed, and controls the lighting unit to perform the emitting action for next cured-layer before the desired 3D model is completely formed.

In comparison with related art, the 3D printer of the present invention may vary the status of the isolation fluid through the arrangement and the activities of the auxiliary mechanism, so as to achieve the purpose of quick printing and smoothing the liquid-level of the liquid material.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
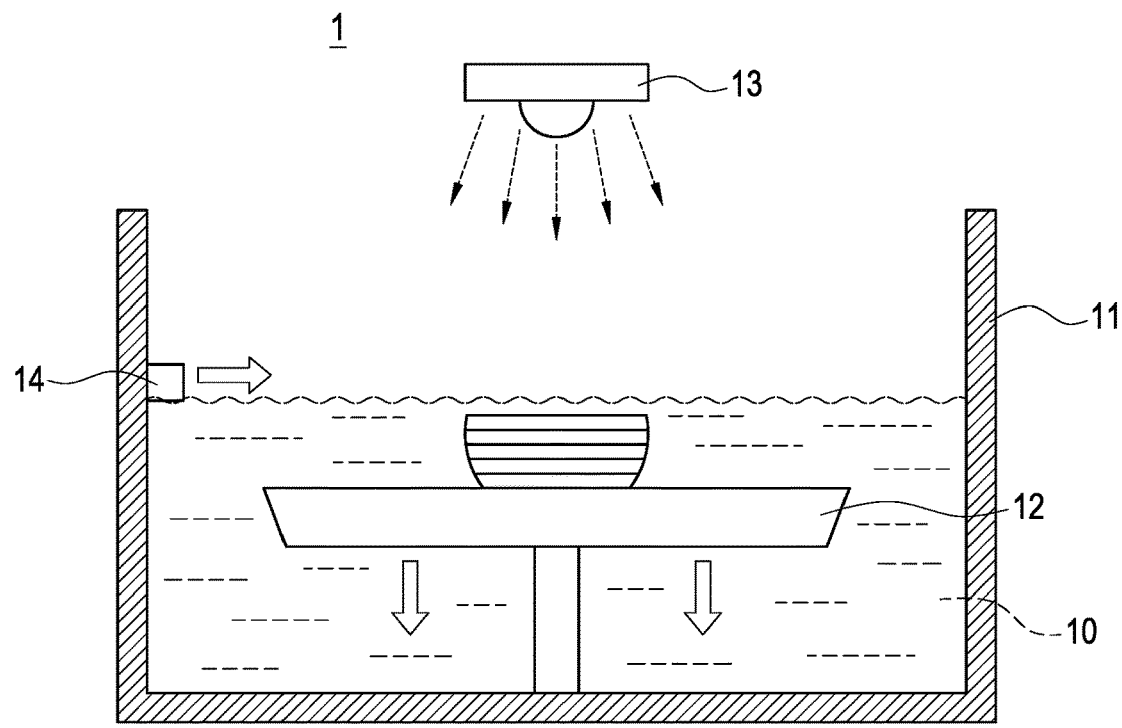
FIG. 1 is a first schematic diagram of a light-curing 3D printer of related art.
Figure 2:
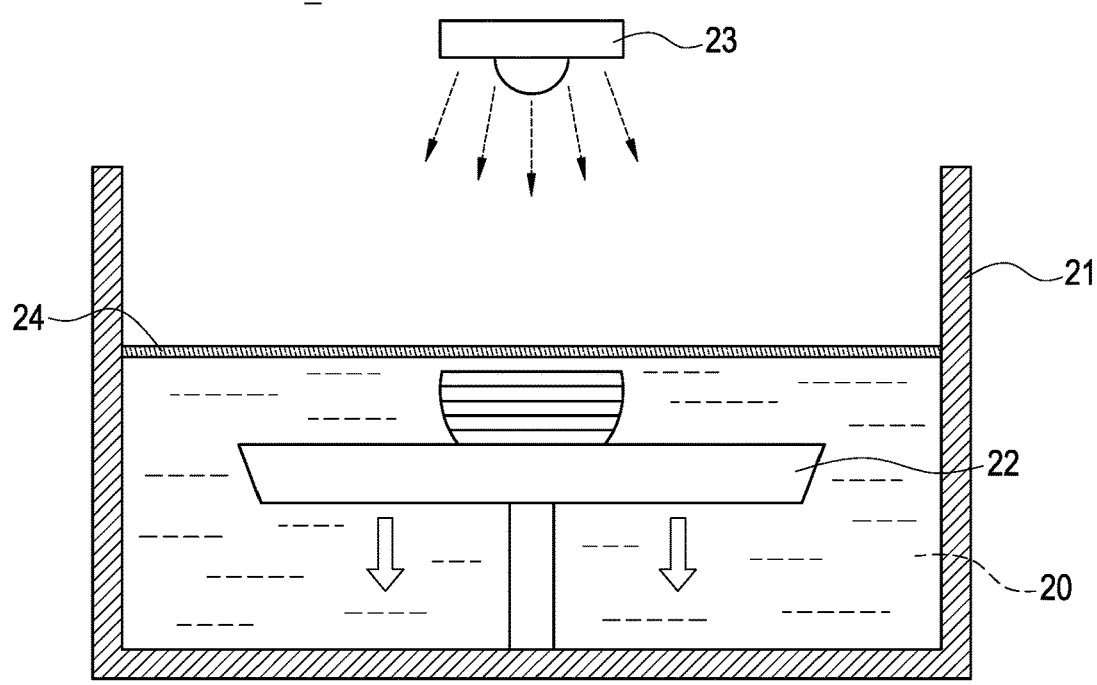
FIG. 2 is a second schematic diagram of a light-curing 3D printer of related art.
Figure 3:
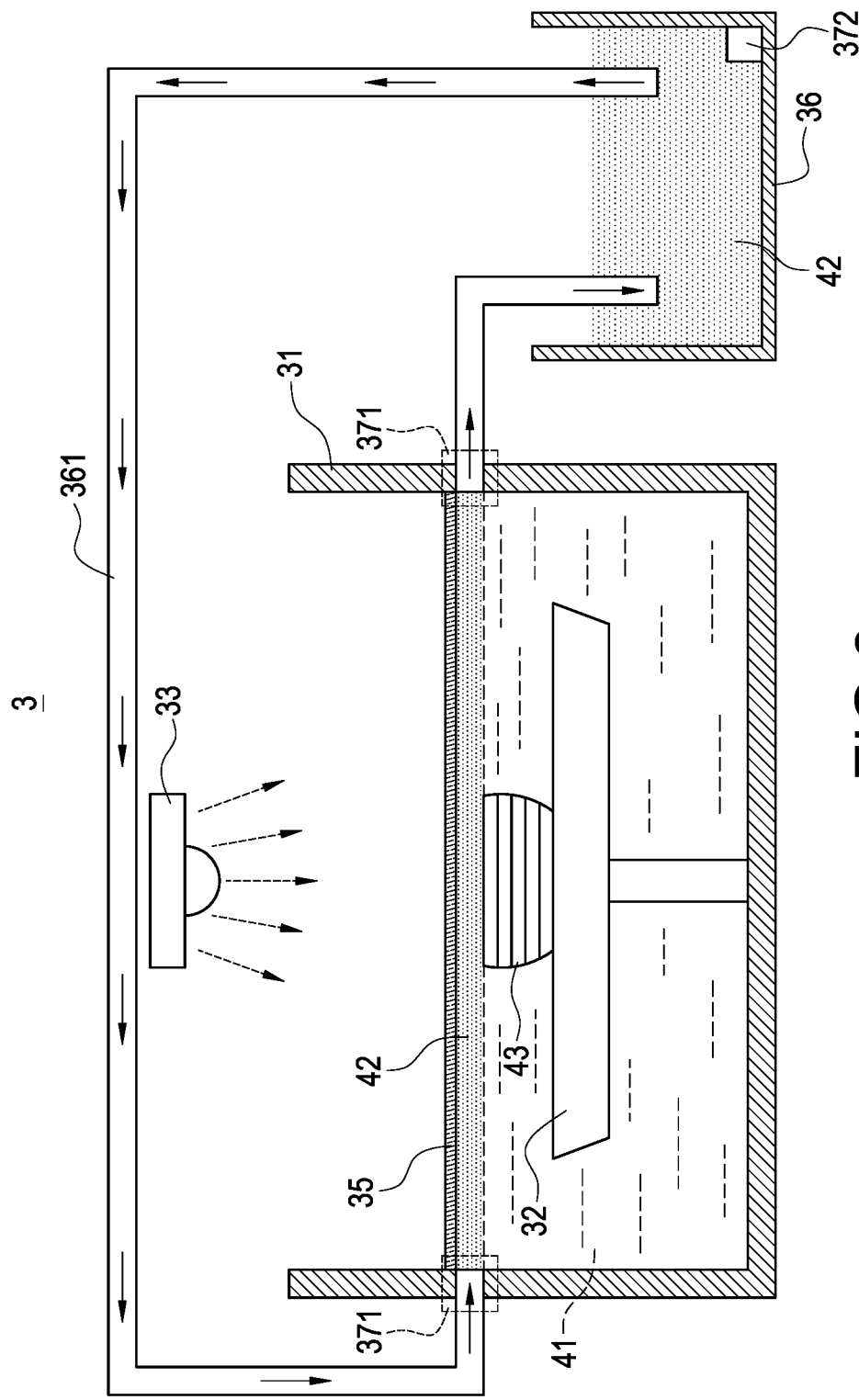
FIG. 3 is a schematic diagram of a 3D printer of a first embodiment according to the present invention.
Figure 5:
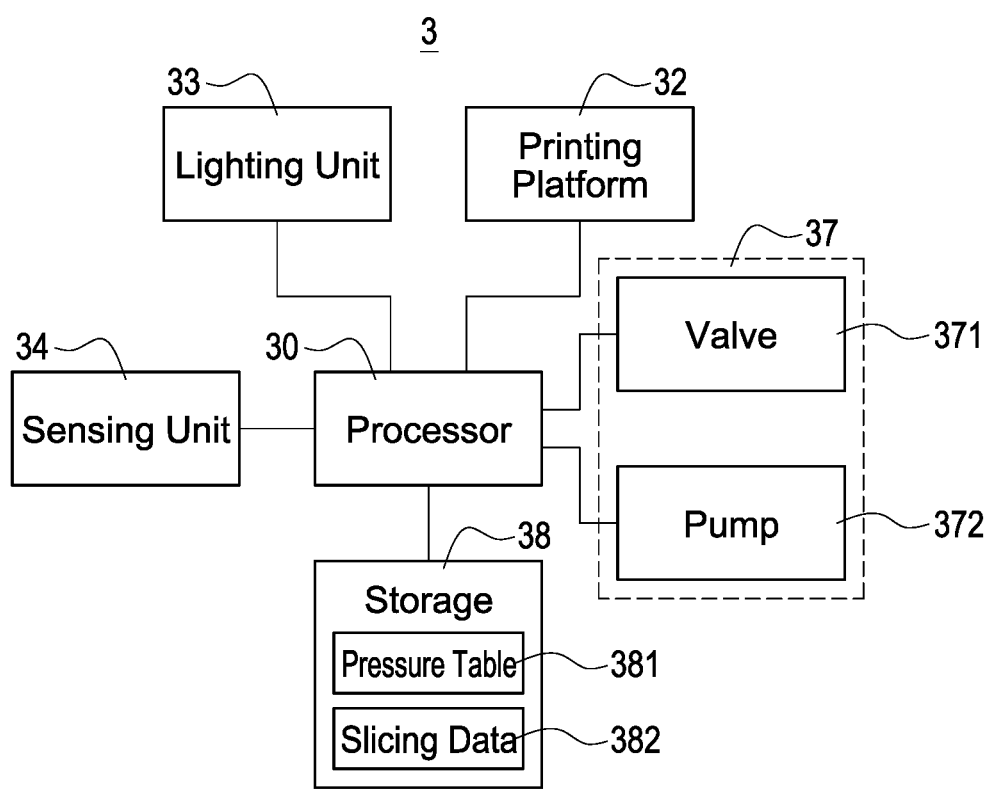
FIG. 5 is a block diagram of the 3D printer of a first embodiment according to the present invention.

Please refers to FIG. 3 and FIG. 5. FIG. 3 is a schematic diagram of a 3D printer of a first embodiment according to the present invention, and FIG. 5 is a block diagram of the 3D printer of a first embodiment according to the present invention. The present invention discloses a light-curing 3D printer capable of printing and liquid-level smooth (referred to as the 3D printer 3 hereinafter). The 3D printer 3 in FIG. 3 and FIG. 5 is illustrated as a stereolithography (SLA) type 3D printer, but not limited thereto, any kind of 3D printer which uses light to cure liquid material for forming 3D objects is able to apply the technical solution provided by the present invention.

As shown in FIG. 3 and FIG. 5, the 3D printer 3 of the present invention mainly includes a processor 30, a main-tank 31, a printing platform 32, a lighting unit 33, a membrane 35 covering the main-tank 31, a first sub-tank 36, an auxiliary mechanism 37, and a storage 38, wherein the processor 30 is electrically connected with the printing platform 32, the lighting unit 33, the auxiliary mechanism 37, and the storage 38.

One of the main technical features of the embodiment is that the 3D printer 3, when performs a printing procedure, is to control the lighting unit 33 to emit light toward the liquid material 41 inside the main-tank 31, so as to cure the liquid material 41 to form a 3D object 43 of one cured-layer on the printing platform 32. After the 3D object 43 is formed, the processor 30 controls the printing platform 32 to lower to a certain height required by next cured-layer, and also controls the auxiliary mechanism 37 while the printing platform 32 is declining. By controlling the auxiliary mechanism 37, the status of an isolation fluid 42 floating upon the liquid material 41 is varied through an auxiliary manner provided by the auxiliary mechanism 37.

In this embodiment, the specific weight of the isolation fluid 42 is smaller than the specific weight of the liquid material 41, and the isolation fluid 42 is set floating upon the liquid material 41.

In one embodiment, the auxiliary manner provided by the auxiliary mechanism 37 is to make the isolation fluid 42 flows or shakes. Therefore, the flowing isolation fluid 42 may help the liquid material 41 to maintain its surface (i.e., liquid-level) in a smooth condition, the shaking isolation fluid 42 may help a 3D object 43 to be peeled quickly from the isolation fluid 42 itself (detailed description in the following).

In the embodiment shown in FIG. 3, the auxiliary mechanism 37 includes valves 371 and a pump 372. The valves 371 are arranged on the main-tank 31, and the first sub-tank 36 is connected to the valves 371 on the main-tank 31 through isolation fluid pipes 361. The pump 372 may be arranged inside the first sub-tank 36 or arranged in the isolation fluid pipes 361, not limited thereto.

In one embodiment, the valves 371 are electric valves, which can be controlled by the processor 30 to change their ON/OFF status. In another embodiment, the valves 371 are directly arranged on the wall of the main-tank 31, but not limited thereto.

The 3D printer 3 in FIG. 3 is illustrated as a bottom-up 3D printer. The main-tank 31 has an opening upward, and inside of the main-tank 31 is a containing space for containing the liquid material 41 and the isolation fluid 42. In this embodiment, the specific weight of the isolation fluid 42 is smaller than the specific weight of the liquid material 41. When both the liquid material 41 and the isolation fluid 42 are contained inside the main-tank 31, the isolation fluid 42 will be floating upon the liquid material 41. In this manner, the isolation fluid 42 in the present invention won't be cured due to the light emitted from the lighting unit 33. The main function of the isolation fluid 42 is to separate the liquid material 41 from the membrane 35, so as to prevent a formed 3D object 43 from attaching directly to the membrane 35 after the curing action.

One of the main technical features of this embodiment is that, the first sub-tank 36 contains the isolation fluid 42 either, and the valves 371 on the main-tank 31 are arranged at a specific height same as the height of the isolation fluid 42 floating in the containing space inside the main-tank 31. In this embodiment, the processor 30 may control the auxiliary mechanism 37 while performing the printing procedure, therefore, the auxiliary manner provided by the auxiliary mechanism 37 may be varying the status of the isolation fluid 42 in the main-tank 31, so as to achieve the purpose of quick printing and smoothing the liquid-level of the liquid material 41.

In one embodiment, the processor 30 controls the auxiliary mechanism 37 to activate such auxiliary manner. The auxiliary manner involves opening the valves 371 and activating the pump 372, therefore, the isolation fluid 42 is pushed by the force of the pump 372 and continually flows between the main-tank 31 and the first sub-tank 36.

When performing the printing procedure, the 3D printer 3 may prevent the formed 3D object 43 from being attached to the membrane 35 through the arrangement of the isolation fluid 42 (both the flowing isolation fluid 42 and the motionless isolation fluid 42). In one embodiment that the isolation fluid 42 is an isolation liquid, the 3D printer 3 varies the status of the isolation liquid (such as keeps the isolation liquid flowing continually) for completely separating the liquid material 41 from the isolation liquid. As a result, the isolation liquid won't be cured even if it received constant light emitted from the lighting unit 33, and the isolation liquid won't be mixable with the liquid material 41, therefore, there's more options for users to choose and decide the type and state of the isolation liquid.

In another embodiment, the 3D printer 3 may further include at least two sets of isolation fluid pipe 361, one end of the two sets of isolation fluid pipe 361 are arranged in the isolation fluid 42 contained in the first sub-tank 36, another end of the two sets of isolation fluid pipe 361 are respectively connected to the two valves 371 on the wall of two sides of the main-tank 31. By the arrangement of the two sets of isolation fluid pipe 361, the isolation fluid 42 can flow between the main-tank 31 and the first sub-tank 36.

What is worth saying is that the isolation fluid 42 can be isolation liquid or isolation gas. The isolation liquid is commonly used in this technical field, detailed description is therefore omitted. The isolation gas is a substance that can maintain in gas state when the temperature is close to room temperature and the pressure is bigger than one atmospheric pressure, such as Air, Nitrogen, and other Inert gas, but not limited thereto. If the isolation fluid 42 is the isolation gas, the inside of the main-tank 31 and the first sub-tank 36 should be maintained completely sealed.

The membrane 35 is arranged upon the isolation fluid 42, the 3D printer 3 forms a seal space inside the main-tank 31 through the arrangement of the membrane 35. In one embodiment, the membrane 35 is, for example, a glass plate, an Acrylic plate, or a Teflon plate, not limited thereto.

The printing platform 32 is arranged inside the main-tank 31, and controlled by the processor 30 to immerse in the liquid material 41. The lighting unit 33 is arranged upon the printing platform 32, and controlled by the processor 30 to emit light toward the printing platform 32.

Specifically, the distance between the surface of the printing platform 32 and the surface of the liquid material 41 (i.e., the bottom of the isolation fluid 42) equals to a height (or thickness) of one cured-layer. After emitting the light toward the printing platform 32, the lighting unit 33 may cure a part of the liquid material 41 located on the surface of the printing platform 32, so as to form a 3D object 43 of one cured-layer. The above curing action is a commonly technical solution used by light-curing 3D printers, detailed description is therefore omitted.

Figure 4:
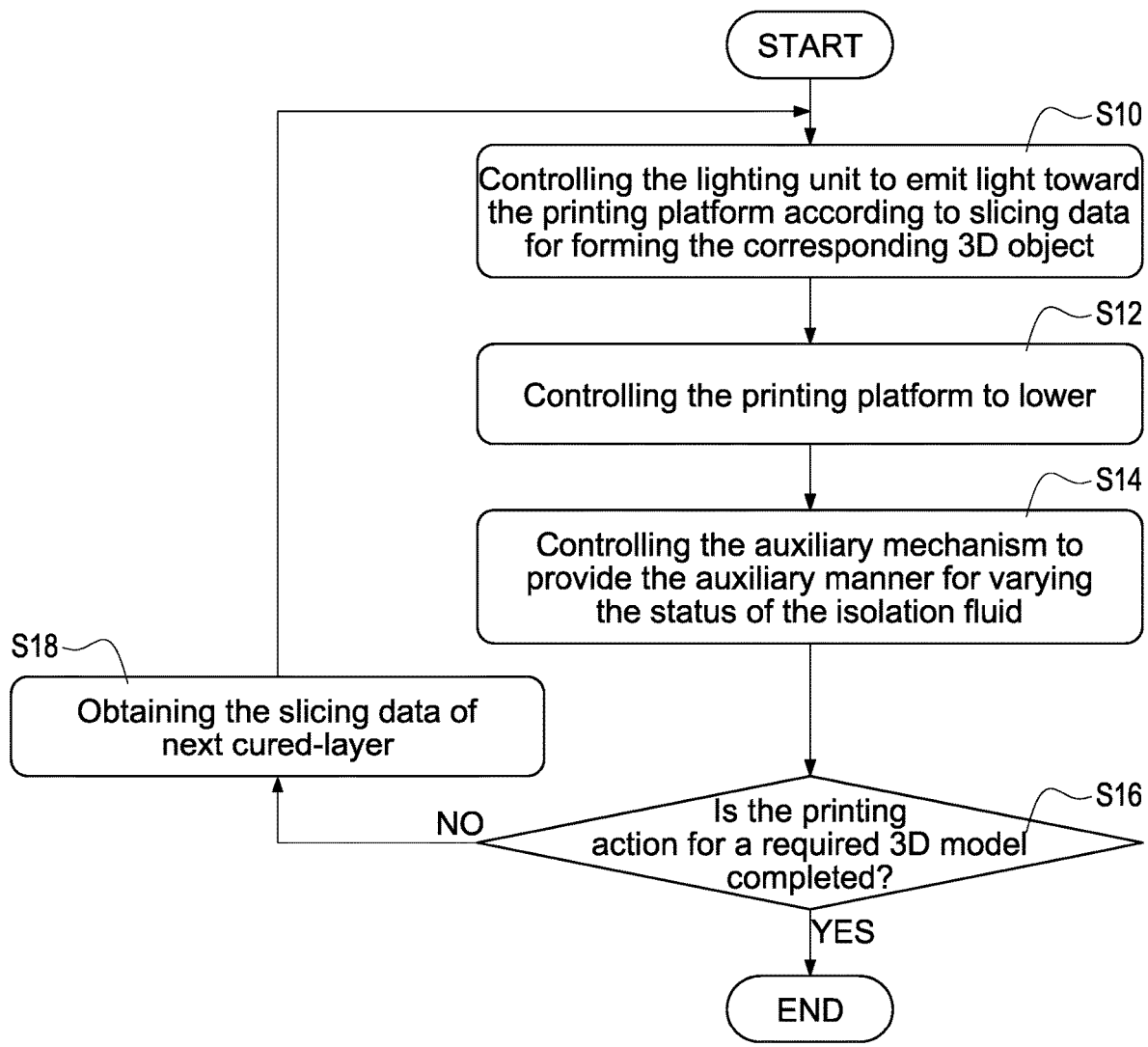
FIG. 4 is a flowchart of a printing method of a first embodiment according to the present invention.

FIG. 4 is a flowchart of a printing method of a first embodiment according to the present invention. The printing method disclosed in FIG. 4 is applied for the 3D printer 3 as shown in FIG. 3 and FIG. 5, so as to make the 3D printer 3 achieving the purpose of quick printing and smoothing the liquid-level of the liquid material 41.

When performing the printing procedure, the 3D printer 3 first controls the lighting unit 33 by the processor 30 to emit light toward the printing platform 32, so as to cure the liquid material 41 located on the surface of the printing platform 32 for forming a corresponding 3D object 43 (step S10).

It should be mentioned that the storage 38, as shown in FIG. 5, stores slicing data 382. In the step S10, the processor 30 accesses the storage 38 for obtaining the slicing data 382 corresponding to the current cured-layer (such as a first layer), and then controls the lighting unit 33 to emit light toward the printing platform 32 according to the obtained slicing data 382. Therefore, the outlook and the shape of the 3D object 43 formed by the 3D printer 3 in the step S10 may be matching with the content described in the slicing data 382.

The aforementioned slicing data 382 is a commonly technical solution used in the light-curing printing field, further description is omitted.

After the 3D object 43 is formed, the processor 30 controls the printing platform 32 to lower (step S12), so the printing platform 32 moves to a printing height associated to next cured-layer (such as a second layer). In the meantime, the processor 30 controls the auxiliary mechanism 37, so the status of the isolation fluid 42 is varied by an auxiliary manner provided by the auxiliary mechanism 37 (step S14). In one embodiment, the auxiliary manner provided by the auxiliary mechanism 37 in the step S14 involves opening the valves 371 and activating the pump 372, so as to force the isolation fluid 42 continually flowing between the main-tank 31 and the first sub-tank 36. According to the flow of the isolation fluid 42, the surface of the liquid material 41 can return to smooth very quick, and the formed 3D object 43 can be easily peeled from the bottom of the isolation fluid 42 (if the isolation fluid 42 is the isolation liquid).

In one embodiment, the processor 30 may first control the printing platform 32 to lower, and then controls the auxiliary mechanism 37 to provide such auxiliary manner. In another embodiment, the processor 30 may first control the auxiliary mechanism 37 to provide the auxiliary manner, and then controls the printing platform 32 to lower. In a further embodiment, the processor 30 may simultaneously control both the printing platform 32 and the auxiliary mechanism 37. In these embodiments, the step S12 and the step S14 do not have a necessary order to be executed.

It should be mentioned that if the valves 371 are the openings directly arranged on the main-tank 31, the auxiliary manner provided by the auxiliary mechanism 37 in the step S14 will only involve activating the pump 372 and without controlling the valves 371.

When the printing platform 32 lowers to a required height, the processor 30 determines whether the printing action for a required 3D model is completed (step S16), i.e., the processor 30 determines whether the slicing data 382 stored in the storage 38 are all used for respectively forming a corresponding 3D object 43.

If the printing action for the 3D model is not completed yet, the processor 30 obtains the slicing data 382 of next cured-layer (step S18), and proceeds to again execute the step S10 to the step S16 for curing and forming the 3D object 43 of the next cured-layer. On the other hand, if the printing action for the required 3D model is completed, the processor 30 may proceed to terminate the printing method.

It should be mentioned that after the step S14, the processor 30 may control the auxiliary mechanism 37 to continually provide the auxiliary manner for varying the status of the isolation fluid 42, for example, keeps the isolation liquid/isolation gas flowing. Besides, the processor 30 may control the auxiliary mechanism 37 to stop providing the auxiliary manner at a specific time point according to the settings set by the user beforehand, so as to stop varying the status of the isolation fluid 42, for example, makes the isolation liquid/isolation gas to stop flowing.

Figure 6:
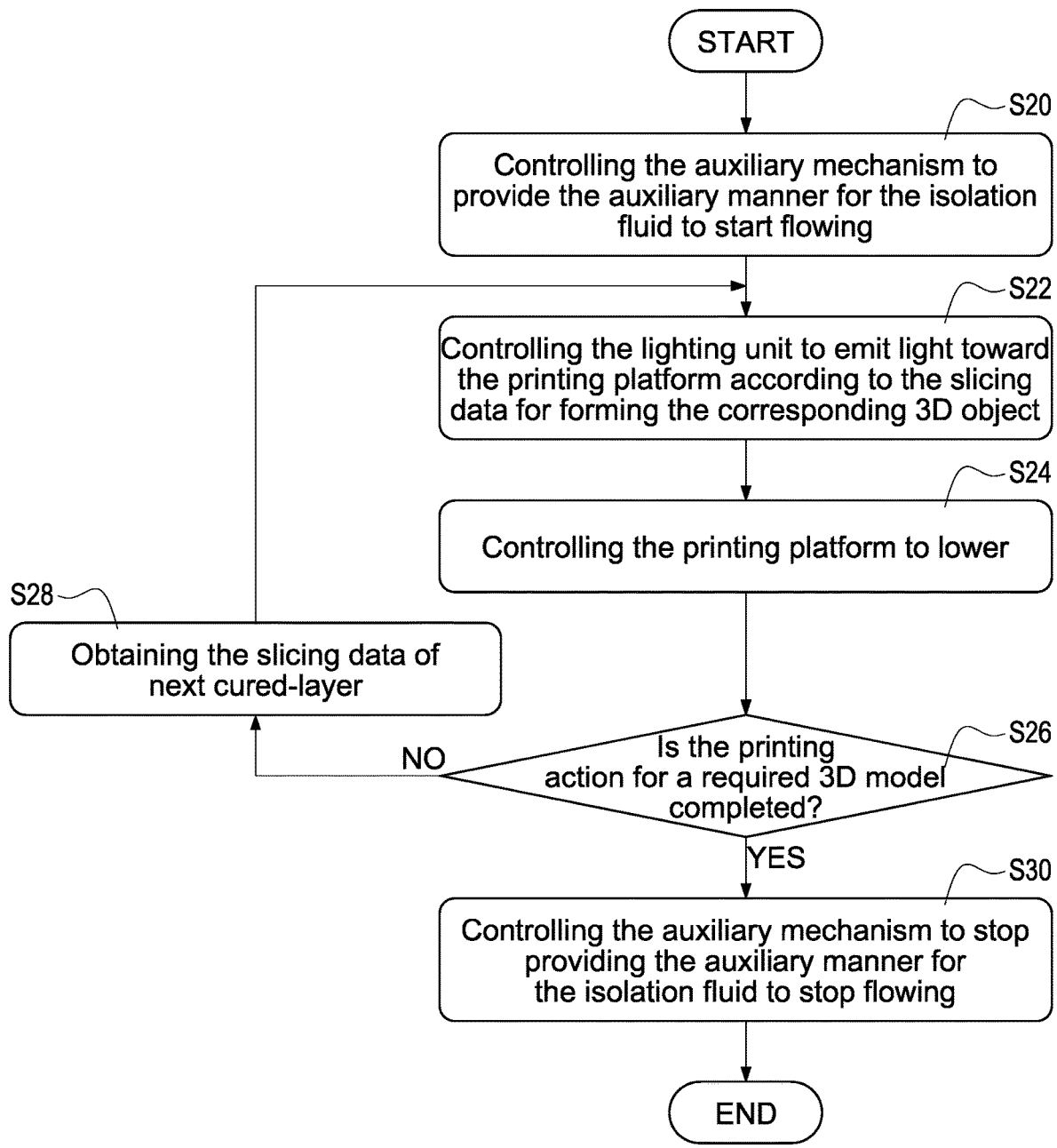
FIG. 6 is a flowchart of the printing method of a second embodiment according to the present invention.

FIG. 6 is a flowchart of the printing method of a second embodiment according to the present invention. In this embodiment, the 3D printer 3 controls the auxiliary mechanism 37 by the processor 30 prior to the printing procedure, and the auxiliary manner provided by the auxiliary mechanism 37 causes the isolation fluid 42 to flow (step S20). In other words, the auxiliary manner provided by the auxiliary mechanism 37 causes the isolation fluid 42 flowing continually from the main-tank 31 to the first sub-tank 36, and then from the first sub-tank 36 back to the main-tank 31.

While the isolation fluid 42 is flowing, the processor 30 obtains the slicing data 382 associated to the current cured-layer from the storage 38, and controls the lighting unit 33 to emit light toward the printing platform 32 according to the obtained slicing data 382, so as to cure a part of the liquid material 41 located on the surface of the printing platform 32 and forms the corresponding 3D object 43 (step S22).

After the 3D object 43 is cured and formed, the processor 30 controls the printing platform 32 to lower to a required height (step S24), and the processor 30 determines whether the printing action for a required 3D model is completed (step S26), i.e., the processor 30 determines if the slicing data 382 stored in the storage 38 are all used for respectively forming the corresponding 3D object 43.

If the printing action for the 3D model is not completed yet, the processor 30 obtains the slicing data 382 of next cured-layer from the storage 38 (step S28), and proceeds to again execute the step S22 to the step S26 for curing the next cured-layer and forming the corresponding 3D object 43 of the next cured-layer. In this embodiment, the 3D printer 3 keeps forcing the isolation fluid 42 to flow during the entire printing procedure. In other words, the 3D printer 3 keeps the valves 371 open and keeps the pump 372 activated during the printing procedure.

When determining that the printing action for the 3D model is completed in the step S26, the processor 30 controls the auxiliary mechanism 37 to stop providing the auxiliary manner, so as to make the isolation fluid 42 stops flowing and proceed to terminate the printing action (step S30).

This embodiment forces the isolation fluid 42 to keep flowing during the entire printing procedure, the 3D printer 3 does not need to peel the formed 3D object 43 from the isolation fluid 42 (if the isolation fluid 42 is the isolation liquid), so the purpose of quick printing can be easily achieved. Besides, the flowing isolation fluid 42 may help the liquid material 41 beneath to maintain its liquid-level in a smooth condition, so as to improve the printing quality.

Figure 7:
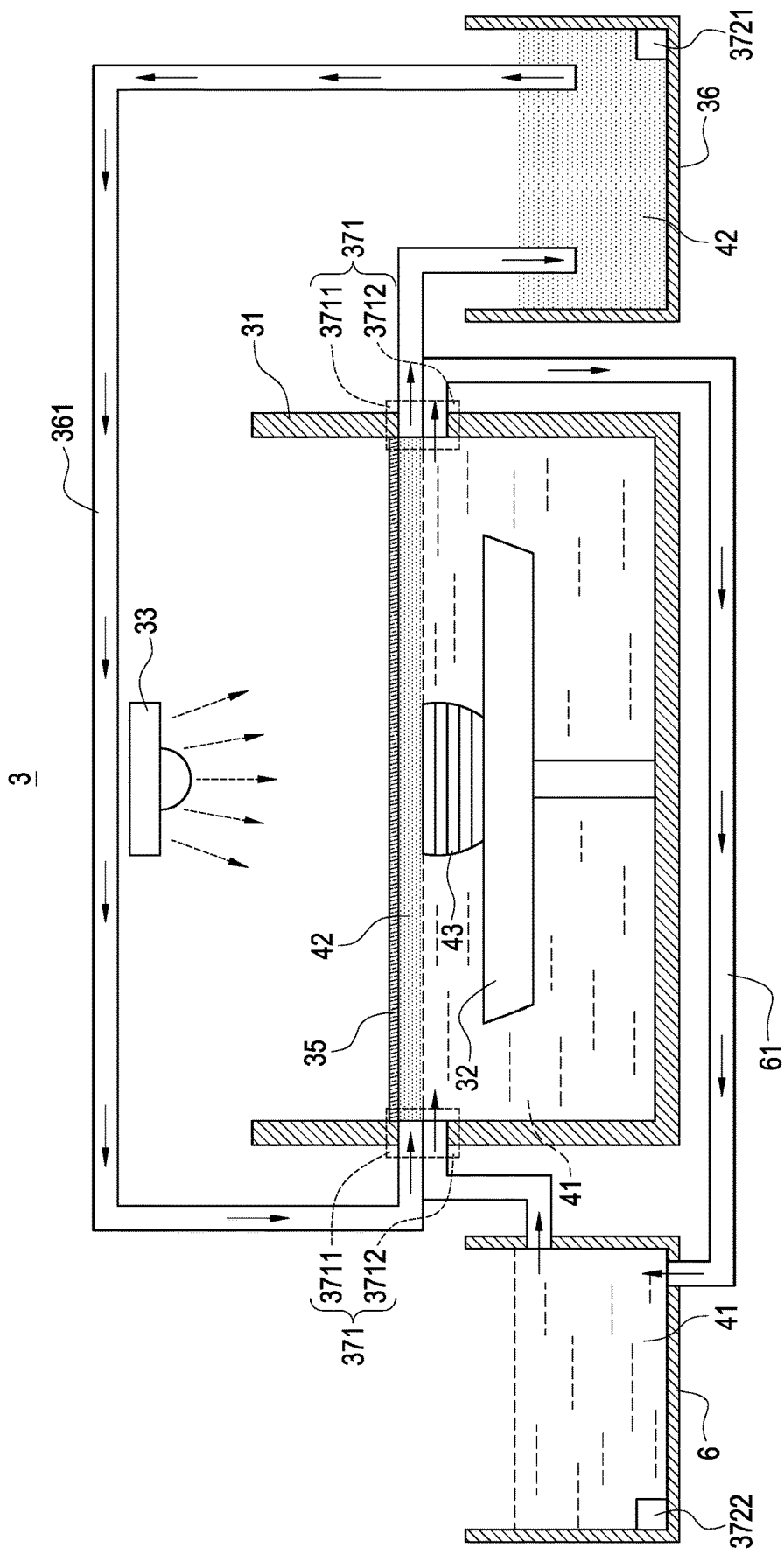
FIG. 7 is a schematic diagram of the 3D printer of a second embodiment according to the present invention.

FIG. 7 is a schematic diagram of the 3D printer of a second embodiment according to the present invention. FIG. 7 discloses another 3D printer 5. The 3D printer 5 is similar to the 3D printer 3 disclosed in FIG. 3 and FIG. 5 which includes the processor 30, the main-tank 31, the printing platform 32, the lighting unit 33, the membrane 35, the first sub-tank 36 for containing the isolation fluid 42, the isolation fluid pipes 361 for connecting the main-tank 31 and the first sub-tank 36, the auxiliary mechanism 37 controlled by the processor 30, and the storage 38.

The difference between the 3D printer 5 and the above 3D printer 3 is that the 3D printer 5 further includes a second sub-tank 6 and two sets of liquid material pipe 61. The second sub-tank 6 contains the liquid material 41, the two sets of liquid material pipe 61 are used to connect the main-tank 31 with the second sub-tank 6. In this embodiment, the auxiliary mechanism 37 of the 3D printer 5 includes two isolation fluid valves 3711, a first pump 3721, two liquid material valves 3712, and a second pump 3722, wherein the two isolation fluid valves 3711 are respectively arranged on the main-tank 31 and respectively connected to the two sets of isolation fluid pipe 361, and the two liquid material valves 3712 are respectively arranged on the main-tank 31 and respectively connected to the two sets of liquid material pipe 61.

One of the main technical features of this embodiment is that, except for the isolation fluid 42, the 3D printer 5 may also vary the status of the liquid material 42 (such as making the liquid material 41 to flow) through the auxiliary manner provided by the auxiliary mechanism 73 after a 3D object 43 of one cured-layer is formed. When controlling the printing platform 32 to lower, the 3D printer 5 may quickly refill the liquid material 41 in the main-tank 31 through the flowing liquid material 41 (which is from the second sub-tank 6), so as to achieve the purpose of quick printing and smoothing the liquid-level of the liquid material 41 in the main-tank 31.

In the embodiment of FIG. 7, the valves 371 and pumps 372 of the auxiliary mechanism 37 include two isolation fluid valves 3711 and a first pump 3721 for delivering the isolation fluid 42, and further include two liquid material valves 3712 and a second pump 3722 for delivering the liquid material 41. The first pump 3721 is arranged in the first sub-tank 36 or one of the two sets of isolation fluid pipe 361. The second pump 3722 is arranged in the second sub-tank 6 or one of the two sets of liquid material pipe 61.

The two isolation fluid valves 3711 are respectively arranged on the wall of two sides of the main-tank 31, and the height of the two isolation fluid valves 3711 arranged on the main-tank 31 is the same as the height of the isolation fluid 42 floating in the main-tank 31. The 3D printer 5 includes at least two sets of isolation fluid pipe 361, one end of the two sets of isolation fluid pipe 361 are arranged in the first sub-tank 36, another end of the two sets of isolation fluid pipe 361 are respectively connected to the two isolation fluid valves 3711. When the two isolation fluid valves 3711 are opened and the first pump 3721 is activated, the isolation fluid 42 may be forced to flow between the main-tank 31 and the first sub-tank 36 through the two isolation fluid valves 3711 and the two sets of isolation fluid pipe 361.

The two liquid material valves 3712 are respectively arranged on the wall of two sides of the main-tank 31, and the height of the two liquid material valves 3712 arranged on the main-tank 31 is the same as the height of the surface of the liquid material 41 in the main-tank 31. As shown in FIG. 7, the liquid material 41 is beneath the isolation fluid 42 in the main-tank 31, and the two liquid material valves 3712 are respectively arranged beneath the two isolation fluid valves 3711.

The 3D printer 5 includes at least two sets of liquid material pipe 61, one end of the two sets of liquid material pipe 61 are arranged in the second sub-tank 6, another end of the two sets of liquid material pipe 61 are connected to the two liquid material valves 3712. When the two liquid material valves 3712 are opened and the second pump 3722 is activated, the liquid material 41 may be forced to flow between the main-tank 31 and the second sub-tank 6 through the two liquid material valves 3712 and the two sets of liquid material pipe 61.

In one embodiment, the isolation fluid 42 is an isolation liquid, the liquid material 41 may be mixable with the isolation liquid, and the density of the liquid material 41 is similar to the density of the isolation liquid. In such manner, the surface tension can be prevented from occurring between the liquid material 41 and the isolation liquid, and the smoothness of the contact surface between the liquid material 41 and the isolation liquid can also be prevented from being varied by gravity. In this embodiment, at least one of the liquid material 41 and the isolation liquid will be kept flowing, so the 3D object 43 won't spread to the isolation liquid and the isolation liquid won't be cured due to the constant light emitted by the lighting unit 33. According to such technical feature, there're much more choices for the liquid material 41 and the isolation liquid suitable for the present invention.

If the isolation fluid 42 is an isolation liquid, the flowing direction of the liquid material 41 and the flowing direction of the isolation liquid may be identical or different. If the liquid material 41 and the isolation liquid share the same flowing direction, the flowing speed of the liquid material 41 should be distinguished from the flowing speed of the isolation liquid, so the liquid material 41 and the isolation liquid can be completely separated and prevented from being merged together. On the contrary, if the flowing direction of the liquid material 41 is different from the flowing direction of the isolation liquid, the flowing speed of the liquid material 41 and the flowing speed of the isolation liquid can be either identical or different. Besides, a user of the 3D printer 5 may select a preferred liquid material 41 and a preferred isolation liquid, set the flowing area (i.e., a size or a range for the isolation fluid valves 3711 and the liquid material valves 3712 to open) and the flowing speed (i.e., the setting parameter of the first pump 3721 and the second pump 3722), so as to keep the liquid material 41 and the isolation liquid flowing in the laminar flow state for achieving a desired effect.

Figure 8:
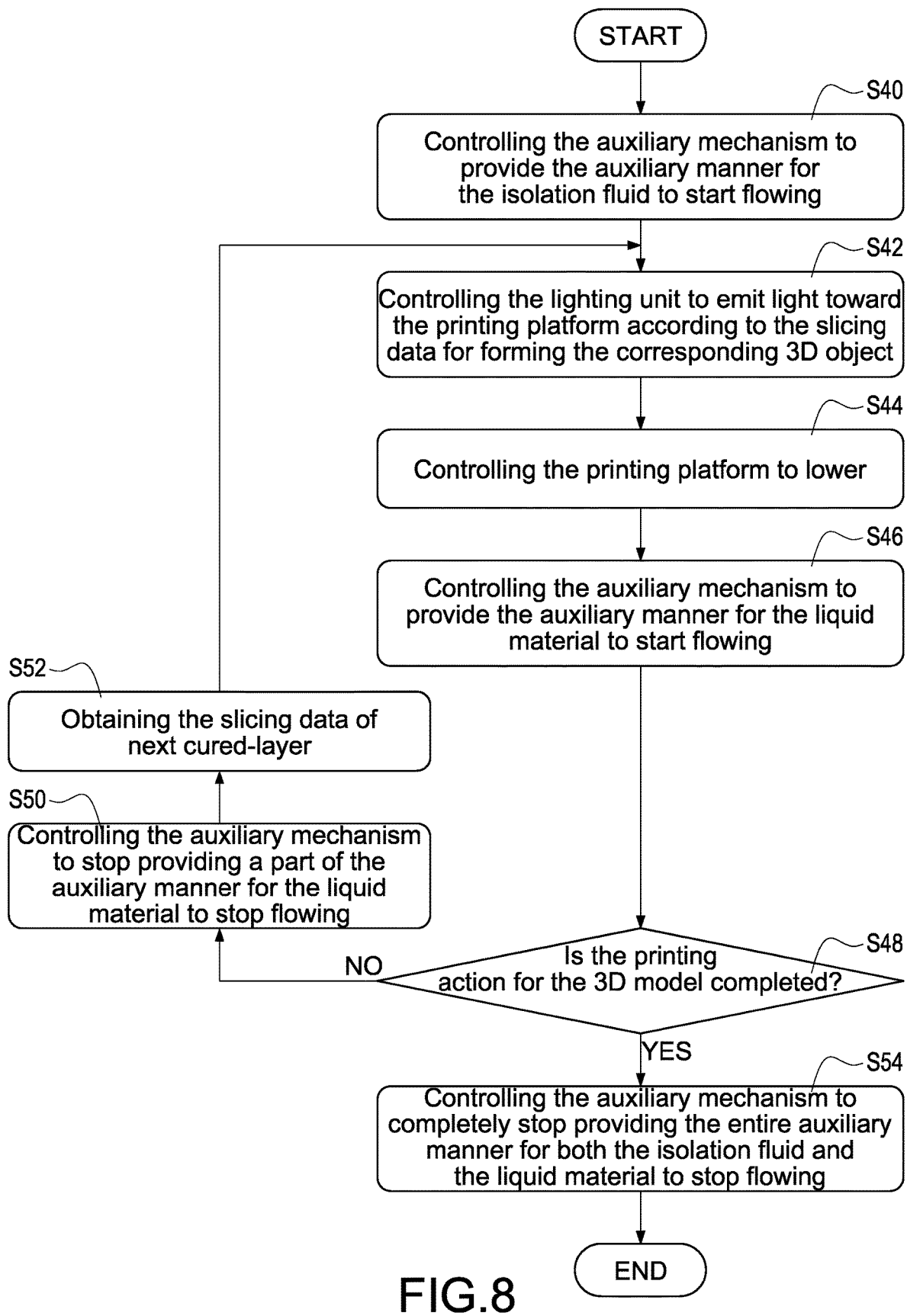
FIG. 8 is a flowchart of the printing method of a third embodiment according to the present invention.

FIG. 8 is a flowchart of the printing method of a third embodiment according to the present invention. In this embodiment, the 3D printer 5 controls the auxiliary mechanism 37 by the processor 30 before executing the printing procedure, so as to use the auxiliary manner provided by the auxiliary mechanism 37 to make the isolation fluid 42 to flow (step S40), i.e., makes the isolation fluid 42 flowing continually from the main-tank 31 to the first sub-tank 36 and then from the first sub-tank 36 back to the main-tank 31.

Specifically, the auxiliary manner provided by the auxiliary mechanism 37 in the step S40 involves opening the isolation fluid valves 3711 as well as activating the first pump 3721, so the isolation fluid 42 in the first sub-tank 36 can flow into the main-tank 31 through one of the two sets of isolation fluid pipe 361, and the isolation fluid 42 in the main-tank 31 can flow into the first sub-tank 36 through another one of the two sets of isolation fluid pipe 361.

While the isolation fluid 42 is flowing, the process 30 obtains the slicing data 382 associated to the current cured-layer from the storage 38, and controls the lighting unit 33 to emit light toward the printing platform 32 according to the obtained slicing data 382, so as to cure a part of the liquid material 41 on the surface of the printing platform 32 and form a corresponding 3D object 43 (step S42).

After the 3D object 43 is formed, the processor 30 next controls the printing platform 32 to lower (step S44), and the printing platform 32 is controlled to move to a certain height for next cured-layer. In the meantime, the processor 30 controls the auxiliary mechanism 37 to provide the auxiliary manner for making the liquid material 41 to flow (step S46), i.e., the auxiliary mechanism 37 forces the liquid material 41 flowing continually from the main-tank 31 into the second sub-tank 6 and from the second sub-tank 6 back to the main-tank 31 through the auxiliary manner.

Specifically, the auxiliary manner provided by the auxiliary mechanism 37 in the step S46 involves opening the liquid material valves 3712 as well as activating the second pump 3722, so the liquid material 41 in the second sub-tank 6 may flow into the main-tank 31 through one of the two sets of liquid material pipe 61, and may flow from the main-tank 31 into the second sub-tank 6 through another one of the two sets of liquid material pipe 61. While the liquid material 41 is flowing, the isolation fluid 42 is also flowing, and the flowing direction/flowing speed of the liquid material 41 and the isolation fluid 42 may be identical or different.

In one embodiment, the processor 30 may first control the printing platform 32 to lower, and then controls the auxiliary mechanism 37 to provide the auxiliary manner for the liquid material 41 to flow. In another embodiment, the processor 30 may first control the auxiliary mechanism 37 to provide the auxiliary manner for the liquid material 41 to flow, and then controls the printing platform 32 to lower. In a further embodiment, the processor 30 may simultaneously control both the printing platform 32 and the auxiliary mechanism 37, the step S44 and the step S46 in this embodiment do not need an essential order to be executed.

After the printing platform 32 lowers to a required height, the processor 30 determines whether the printing action for the 3D model is completed (step S48), i.e., the processor 30 determines whether the slicing data 382 stored in the storage 38 are all used respectively for forming a corresponding 3D object 43.

If the printing action for the 3D model is not completed yet, the processor 30 first controls the auxiliary mechanism 37 to stop providing a part of the auxiliary manner, so as to make the liquid material 41 to stop flowing (step S50). Next, the processor 30 obtains the slicing data 382 of next cured-layer from the storage 38 (step S52), and then again executes the step S42 to the step S48 for curing the next cured-layer and forming a corresponding 3D object 43 of the next cured-layer.

In particular, the part of the auxiliary manner being stopped in the step S50 involves closing the liquid material valves 3713 and/or turning the second pump 3722 off, so the liquid material 41 is stopped from flowing between the main-tank 31 and the second sub-tank 6.

Besides, the processor 30 may make the liquid material 41 to stop flowing prior to obtaining the slicing data 382 of the next cured-layer, or obtains the slicing data 382 prior to stopping the liquid material 41, there's no essential order for the step S50 and the step S52 to be executed.

It should be mentioned that, in the printing procedure for the 3D model, the 3D printer 5 only make the liquid material 41 to stop flowing, but the isolation fluid 42 will keep flowing. More specific, when the processor 30 controls the auxiliary mechanism 37 to stop providing a part of the auxiliary manner, the part of the auxiliary manner being stopped only involves closing the liquid material valves 3712 and/or the second pump 3722, the isolation fluid valves 3711 and the first pump 3721 are not included and kept opening/activated. If the processor 30 determines that the printing action for the 3D model is completed in the step S48, the processor 30 may then control the auxiliary mechanism 37 to completely stop providing the entire auxiliary manner, so as to make both the isolation fluid 42 and the liquid material 42 to stop flowing for terminating the printing action (step S54).

In particular, the auxiliary mechanism 37 in the step S54 closes the isolation fluid valves 3711 and/or turns the first pump 3721 off to completely stop providing the entire auxiliary manner, so as to stop the isolation fluid 42 from flowing between the main-tank 31 and the first sub-tank 36.

The 3D printer 5 in this embodiment makes the liquid material 41 flowing continually while the printing platform 32 is declining, in doing so, the liquid material 41 in the main-tank 31 can be quickly refilled. As a result, the purpose of quick printing can be achieved, as well as the printing quality is improved.

Figure 9:
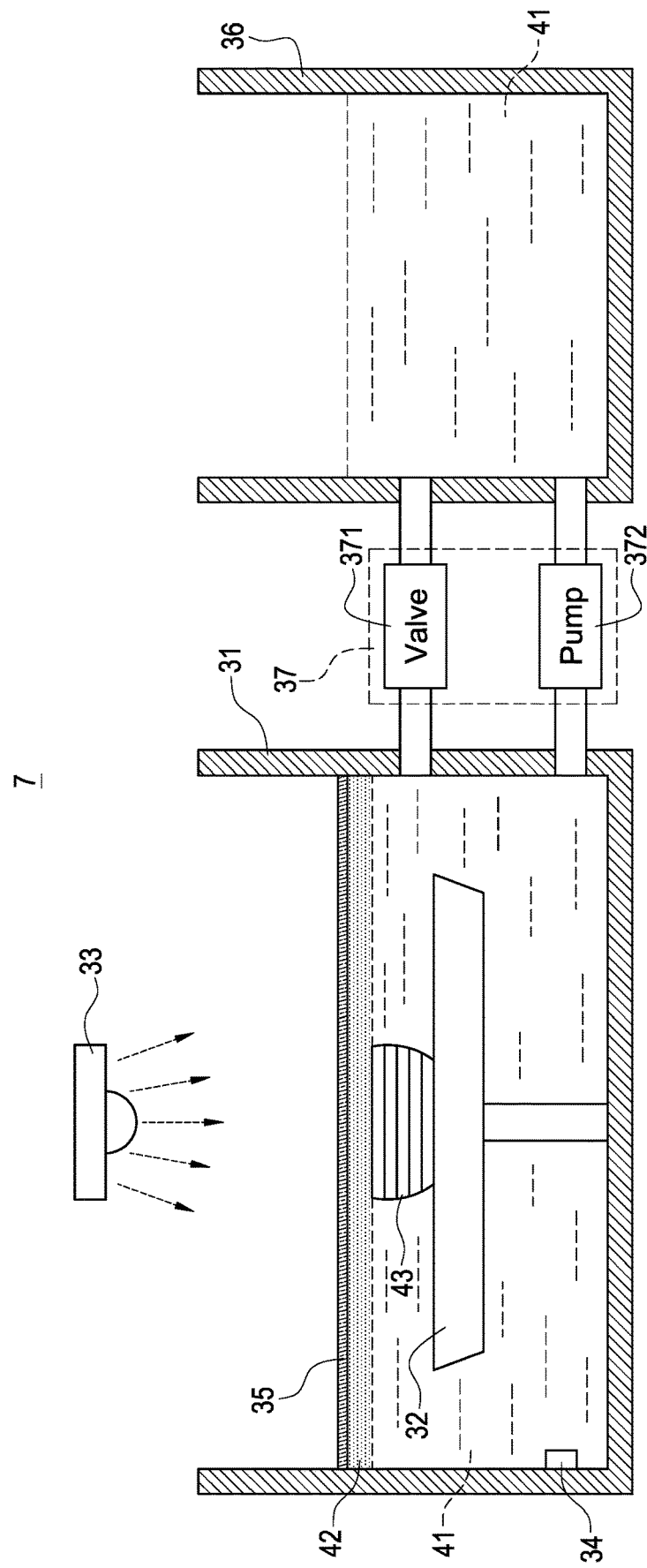
FIG. 9 is a schematic diagram of the 3D printer of a third embodiment according to the present invention.

FIG. 9 is a schematic diagram of the 3D printer of a third embodiment according to the present invention. FIG. 9 discloses another 3D printer 7. The 3D printer 7 is similar to the 3D printer 3 as shown in FIG. 3 and FIG. 5, which includes the processor 30, the main-tank 31, the printing platform 32, the lighting unit 33, the membrane 35, the first sub-tank 36, the auxiliary mechanism 37 controlled by the processor 30, and the storage 38.

The difference between the 3D printer 7 and the 3D printer 3 in FIG. 3 is that the 3D printer 7 uses the first sub-tank 36 to contain the liquid material 41, and the auxiliary mechanism 37 of the 3D printer 7 includes a valve 371 and a pump 372 which directly communicated the main-tank 31 to the first sub-tank 36.

In particular, the valve 371 connects one side of the main-tank 31 and one side of the first sub-tank 36. When the valve 371 is opened, the main-tank 31 may communicate with the first sub-tank 36 through the valve 371. The pump 372 connects one side of the main-tank 31 and one side of the first sub-tank 36. When the pump 372 is activated, the liquid material 41 in the first sub-tank 36 can be injected into the main-tank 31 for pressing the inside of the main-tank 31, and the status of the isolation fluid 42 in the main-tank 31 upon the liquid material 41 will be varied due to the pressure from the pump 372.

Before printing, the processor 30 has to ensure that the pressure of the main-tank 31 and the first sub-tank 36 reach a balance, the printing platform 32 is located at a required height for a cured-layer, and the liquid-level of the liquid material 41 in the main-tank 31 is smooth. For smoothing the liquid-level of the liquid material 41, the pump 372 has to be turned off. In this embodiment, the liquid-level of the liquid material 41 is a contact surface of the liquid material 41 and the isolation fluid 42.

During printing, the processor 30 controls the lighting unit 33 to emit light toward the printing platform 32 for curing a part of the liquid material 41 and forming a 3D object 43 of one cured-layer.

If the isolation fluid 42 applied by the 3D printer 7 is an isolation liquid, because the isolation liquid in this embodiment won't flow, a 3D object 43 might attach to the bottom of the isolation liquid due to the surface tension after it is formed. Accordingly, the processor 30 controls the printing platform 32 to lower to a certain height for next cured-layer, and in the meantime, the processor 30 may control the auxiliary mechanism 371 to provide an auxiliary manner, so as to quickly peel the 3D object 43 from the bottom of the isolation liquid and makes the liquid-level of the liquid material 41 back in a smooth condition.

In particular, the auxiliary manner provided by the auxiliary mechanism 371 involves closing the valve 371 for sealing the inside of the main-tank 31 and activating the pump 372 of the auxiliary mechanism 371 for pressurizing the inside of the main-tank 31.

When the pump 372 pressurizes the inside of the main-tank 31, it is actually injecting few liquid material 41 from the first sub-tank 36 to the main-tank 31, so as to increase the internal pressure of the main-tank 31 and shake the liquid material 41 in the main-tank 31 for varying the status of the isolation fluid 42 floating upon the liquid material 41 in the main-tank 31 (i.e., shaking the isolation fluid 42). Therefore, the 3D object 43 can be quickly peeled from the bottom of the isolation build 42 (if the isolation fluid 42 is the isolation liquid), so as to achieve the purpose of quick printing.

When the processor 30 determines that the 3D object 43 has been peeled, for example, determines that an expected time-period has passed, or the internal pressure of the main-tank 31 has reached an expected value, it can then control the auxiliary mechanism 37 to stop providing the auxiliary manner, so as to stop varying the status of the isolation fluid 42. More specific, the auxiliary mechanism 37 stops varying the status of the isolation fluid 42 by way of turning the pump 372 off to stop pressurizing the main-tank 31. Next, the processor 30 opens the valve 371, so the main-tank 31 may release its internal pressure to the first sub-tank 36 through the opened valve 371, and eventually an equalization of pressure between the main-tank 31 and the first sub-tank 36 is reached.

Specifically, the internal pressure of the main-tank 31 and the internal pressure of the first sub-tank 36 have already reached a balance before printing. When the pump 372 is activated, the internal pressure of the main-tank 31 becomes bigger than the internal pressure of the first sub-tank 36. When the valve 371 is opened, the internal pressure of the main-tank 31 will be released toward the first sub-tank 36 through the opened valve 371 by delivering a part of the liquid material 41 in the main-tank 31 to the first sub-tank 36. Finally, the main-tank 31 and the first sub-tank 36 will reach an equalization of pressure.

One of the technical effects of the present invention is that, by ensuring the equalization of pressure between the main-tank 31 and the first sub-tank 36, the liquid-level of the liquid material 41 in the main-tank 31 can become smooth very quick (and the isolation fluid 42 upon the liquid material 41 may become motionless), so the quality of curing for the 3D object 43 will be effectively improved.

In this embodiment, the 3D printer 7 further includes a sensing unit 34 arranged in the main-tank 31 and electrically connected to the processor 30. The sensing unit 34 is a sensor for monitoring the internal pressure of the inside of the main-tank 31, so the processor 30 may determine whether the internal pressure of the main-tank 31 reaches the expected value through the sensing result from the sensing unit 34. Whenever the internal pressure of the main-tank 31 reaches the expected value, the processor 30 controls the auxiliary mechanism 37 to stop providing the auxiliary manner, i.e., controls the pump 372 of the auxiliary mechanism 37 to stop pressurizing the inside of the main-tank 31.

In another embodiment, the 3D printer 7 further includes a timer (not shown) electrically connected to the processor 30. The timer may start to count after the pump 372 is activated. In this embodiment, the processor 30 may determine that the 3D object 43 should have been peeled from the isolation fluid 42 (if the isolation fluid 42 is an isolation liquid) completely when the timer counts for the expected time-period such as 0.5 second, 1 second, etc., and then controls the pump 372 to stop pressurizing the main-tank 31. However, the above descriptions are only few of the plurality of embodiments of the present invention, not limited thereto.

As disclosed in FIG. 5 and FIG. 9, the storage 38 of the 3D printer 7 may store a pressure table 381, which records at least one expected value. In this embodiment, the processor 30 may control the sensing unit 34 to sense the internal pressure of the main-tank 31 when the pump 372 is activated, and also read such expected value from the pressure table 381. After a comparison has been done by the sensed result and the expected value, the processor 30 may determine when to control the pump 372 to stop pressurizing.

In another embodiment, the pressure table 381 may record multiple expected values which respectively correspond to different printing scenario. When controlling the pump 372 to pressurize, the processor 30 may apply different expected value according to different printing scenario (detailed described in the following) for being compared with the internal pressure of the main-tank 31.

Figure 10:
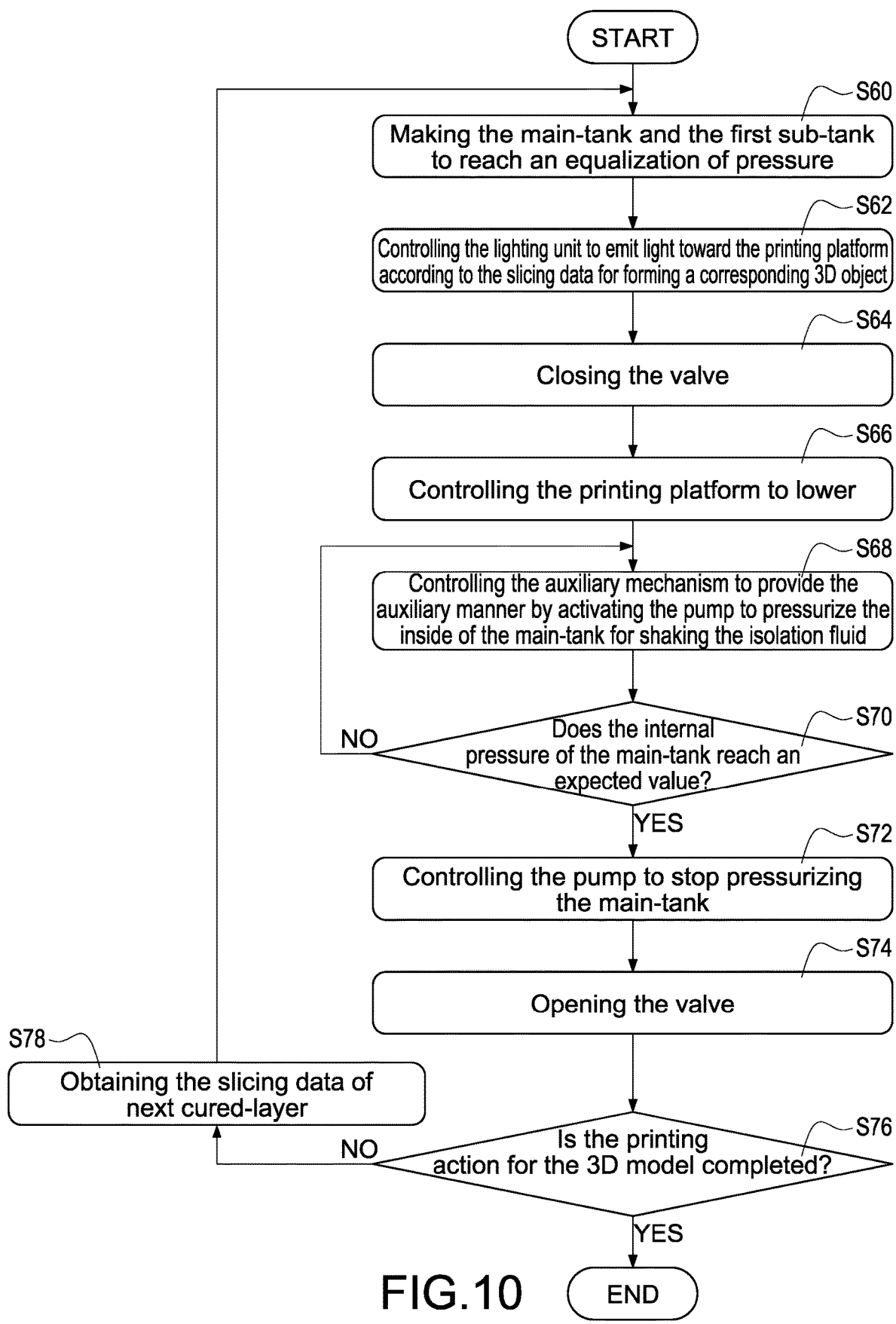
FIG. 10 is a flowchart of the printing method of a fourth embodiment according to the present invention.

FIG. 10 is a flowchart of the printing method of a fourth embodiment according to the present invention. The printing method disclosed in FIG. 10 is applied for the 3D printer 7 disclosed in FIG. 9 for the 3D printer 7 to achieve the purpose of quick printing and liquid-level smoothing.

Before printing, the 3D printer 7 makes the main-tank 31 and the first sub-tank 36 to reach an equalization of pressure (step S60). In this embodiment, the 3D printer 7 controls the valve 371 to open by the processor 30, so the liquid material 41 in the main-tank 31 may flow to the first sub-tank 36, and vice versa. When the liquid material 41 in both the main-tank 31 and the first sub-tank 36 stops flowing (in the meantime, the status of the isolation fluid 42 in the main-tank 31 should stop varying), it means that the main-tank 31 and the first sub-tank 36 have reached the equalization of pressure. When the equalization of pressure has been reached, the liquid-level of the liquid material 41 in the main-tank 31 becomes smooth.

Next, the processor 30 controls the lighting unit 33 to emit light toward the printing platform 32, so as to cure a part of the liquid material 41 located on the surface of the printing platform 32 for forming a corresponding 3D object 43 (step S62). In particular, the processor 30 in the step S62 is to obtain the slicing data 382 associated to the current cured-layer from the storage 38, and controls the light unit 33 to emit light toward the printing platform 32 according to the obtained slicing data 382. Therefore, the shape of the 3D object 43 formed by the 3D printer 7 at the step S62 will match the content described by the slicing data 382.

After the 3D object 43 is formed, the processor 30 first closes the valve 371 (step S64), and controls the printing platform 32 to lower to a required height of next cured-layer (step S66). In the meantime, the processor 30 controls the auxiliary mechanism 37 to provide the auxiliary manner after the valve 371 has been closed, i.e., activating the pump 372 to pressurize the inside of the main-tank 31 for shaking the isolation fluid 42 in the main-tank 31 (step S68). In this embodiment, the pump 372 may inject the liquid material 41 in the first sub-tank 36 to the main-tank 31 after being activated, therefore, the pump 372 may pressurize the main-tank 31 for shaking the isolation fluid 42 floating upon the liquid material 41, so as to peel the formed 3D object 43 from the bottom of the isolation fluid 42.

It should be mentioned that the processor 30 may control the printing platform 32 and the pump 372 in an order, or simultaneously control both the printing platform 32 and the pump 372, the step S66 and the step S68 do not have an essential order to be executed.

After the step S68, the processor 30 keeps determining whether the internal pressure of the main-tank 31 reaches an expected value recorded in the pressure table 381 (step S70). For an instance, the processor 30 may sense the pressure inside the main-tank 31 through the sensing unit 34, or counts the time of the pressurization of the pump 372 through the timer. If the internal pressure of the main-tank 31 has not reached the expected value yet, the processor 30 controls the pump 372 to keep pressurizing the main-tank 31. If the internal pressure of the main-tank 31 has reached the expected value, the processor 30 controls the auxiliary mechanism 37 to stop providing the auxiliary manner, i.e., controls the pump 372 to stop pressurizing the main-tank 31 (step S72), so as to stop shaking the isolation fluid 42 in the main-tank 31.

It should be mentioned that the purpose of pressurizing the main-tank 31 is to quickly peel the formed 3D object 43 from the bottom of the isolation fluid 42 by shaking the isolation fluid 42 (i.e., varying the status of the isolation fluid 42). If the contact area of the 3D object 43 and the isolation fluid 42 is huge, an extra pressure needed for peeling the 3D object 43 from the isolation fluid 42 should be bigger, and vice versa.

In one embodiment, the pressure table 381 may store multiple expected values. The processor 30 in the step S70 may first obtain the slicing data 382 associated to the current cured-layer for determining a cross-section area of a 3D object 43 of the cured-layer, and inquires the pressure table 381 according to the cross-section area for obtaining a specific expected value which is corresponding to the size of the cross-section area. If the cross-section area of the 3D object 43 is small, the expected value for the pump 372 will be small (i.e., the time of the pressurization is short). In other words, the pump 372 may apply different pressures to the main-tank 31 after each 3D object 43 of each cured-layer is formed (i.e., each pressurization has been applied for different time-period). Therefore, the overall printing time of the 3D printer 7 is optimized.

After the step S72, the processor 30 opens the valve 371 (step S74). Because the internal pressure of the main-tank 31 will be bigger than the internal pressure of the first sub-tank 36 after the step S72 (due to the pressurization), the internal pressure of the main-tank 31 will be released toward the first sub-tank 36 for equalization of pressure after the valve 371 is opened. In this embodiment, the releasing approach of the main-tank 31 is to make a part of the liquid material 41 in the main-tank 31 to flow to the first sub-tank 36 through the valve 371. After the main-tank 31 and the first sub-tank 36 reach the equalization of pressure, the liquid material 41 in the main-tank 31 stops flowing and the isolation fluid 42 stops being shaken, and the liquid-level of the liquid material 41 becomes smooth. After the liquid-level of the liquid material 41 in the main-tank 31 recovers in the smooth condition, the processor 30 may proceed to perform further curing actions for next cured-layer.

In one embodiment, the processor 30 may presume that the main-tank 31 and the first sub-tank 36 have reached the equalization of pressure after the valve 371 opened for a predetermined time, such as 2 second, 3 second, etc. In another embodiment, the processor 30 may control the sensing unit 34 to sense the condition of the liquid material 41 in the main-tank 31, and determines whether the main-tank 31 and the first sub-tank 36 reach the equalization of pressure according to the sensed result. In a further embodiment, the processor 30 may capture an image of the liquid-level of the liquid material 41 through an image capturing unit such as a camera (not shown), and determines whether the main-tank 31 and the first sub-tank 36 reach the equalization of pressure through applying an image identification technology on the captured image.

After the equalization of pressure of the main-tank 31 and the first sub-tank 36 has been reached, the processor 30 then determines whether the printing action for the 3D model is completed (step S76), i.e., the processor 30 determines whether the slicing data 382 stored in the storage 38 are all used for respectively forming a corresponding 3D object 43.

If the printing action for the 3D model is not completed yet, the processor 30 obtains the slicing data 382 of next cured-layer (step S78), and proceeds to again execute the step S60 to the step S76 for curing the next cured-layer.

If the printing action for the 3D model is completed, the processor 30 proceeds to terminate the printing method.

Figure 11A:
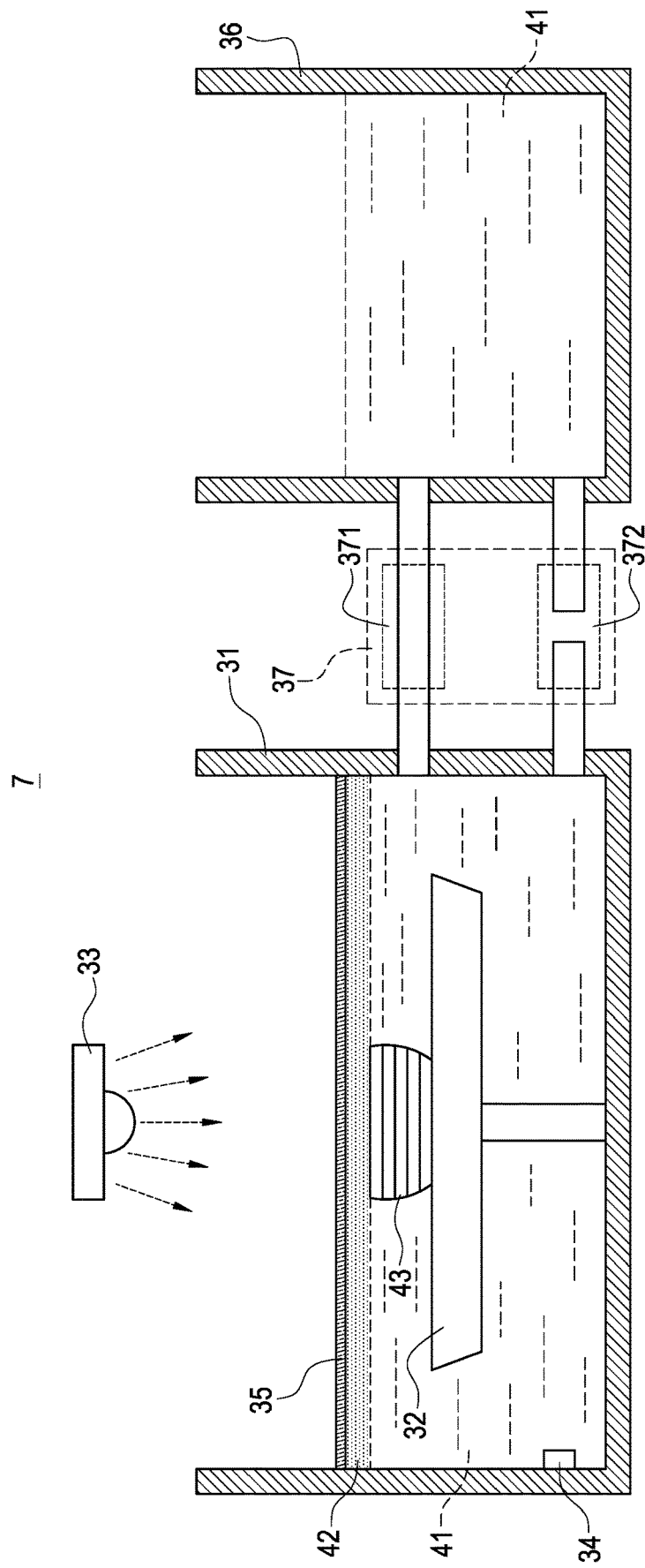
FIG. 11A is a schematic diagram of a first printing action of a first embodiment according to the present invention.
Figure 11B:
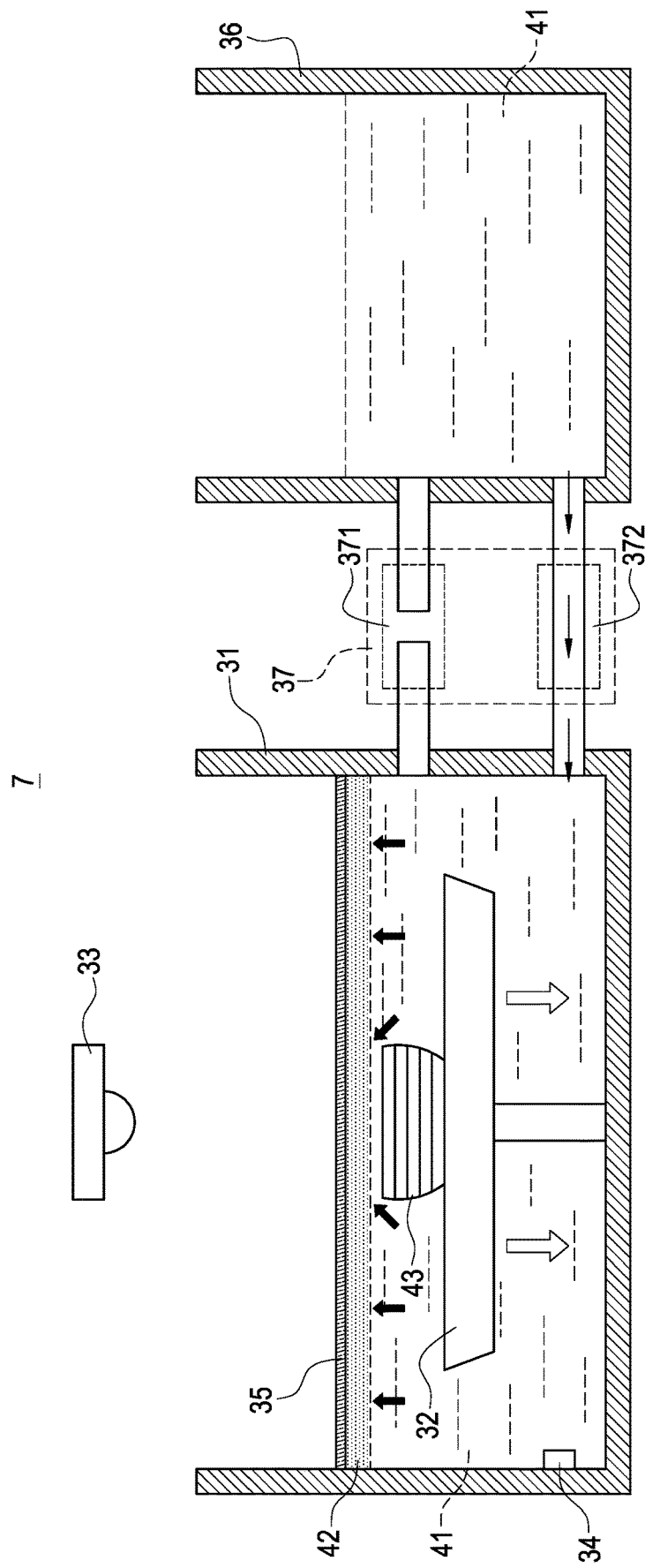
FIG. 11B is a schematic diagram of a second printing action according to the present invention.
Figure 11C:
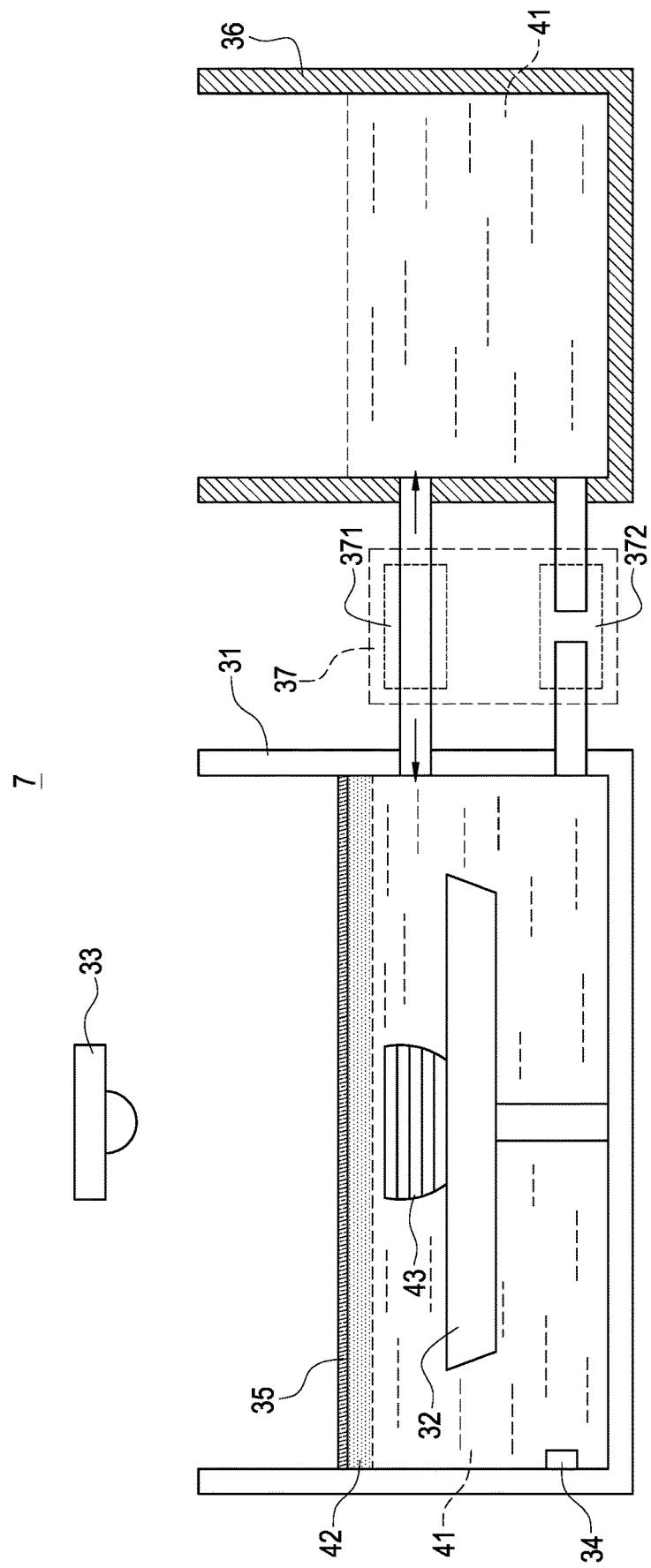
FIG. 11C is a schematic diagram of a third printing action according to the present invention.

Please further refers to FIG. 11A to FIG. 11C, wherein FIG. 11A to FIG. 11C are schematic diagrams of a first printing action, a second printing action, and a third printing action of a first embodiment according to the present invention. In particular, FIG. 11A, FIG. 11B, and FIG. 11C are used for detailed describing the printing action applied by the 3D printer 7 as shown in FIG. 9.

As shown in FIG. 11, when the main-tank 31 and the first sub-tank 36 reach the equalization of pressure (i.e., the liquid-level of the liquid material 41 maintains smooth and the isolation fluid 42 stops being shaken) and the pump 372 turns off, the processor 30 may control the lighting unit 33 to emit light toward the printing platform 32 according to the slicing data 382 for forming a corresponding 3D object 43. It is worth saying that the valve 371 may be opened or closed while the lighting unit 33 emits the light, the only limitation is that the liquid-level of the liquid material 41 has to be smooth.

Next, as shown in FIG. 11B, after the 3D object 43 is formed, the processor 30 closes the valve 371, controls the printing platform 32 to lower, and activates the pump 372 to pressurize the main-tank 31 (i.e., controls the auxiliary mechanism 37 to provide the auxiliary manner). In the embodiment of FIG. 11B, the contact part of the pump 372 and the main-tank 31 is at one side near the bottom of the main-tank 31, therefore, the liquid material 41 can be prevented from crashing directly toward the formed 3D object 43 when the pump 372 injects the liquid material 41 in the first sub-tank 36 to the main-tank 31. As a result, the 3D object 43 is prevented from being damaged due to the pressurization of the pump 372.

Next, as shown in FIG. 11C, after the pressurization of the pump 372, the processor 30 controls the pump 372 to stop pressurizing (i.e., controls the auxiliary mechanism 37 to stop providing the auxiliary manner), and opens the valve 371, so the main-tank 31 may release the internal pressure toward the first sub-tank 36. After releasing for a certain time-period, the equalization of pressure can be reached between the main-tank 31 and the first sub-tank 36.

After the equalization of pressure between the main-tank 31 and the first sub-tank 36 has been reached, the processor 30 may then controls the lighting unit 33 to emit light, as shown in FIG. 11A, according to the slicing data 382 with respect to next cured-layer, so as to form the 3D object 43 of the next cured-layer, until the whole 3D model is completely formed.

In this embodiment, the 3D printer 7 may peel the 3D object 43 quickly from the bottom of the isolation fluid 42 (if the isolation fluid 42 is an isolation liquid) through controlling the auxiliary mechanism 37 (i.e., the valve 371 and the pump 372). Therefore, the liquid-level of the liquid material 41 can recover in the smooth condition very quick, and the purpose of the 3D printer 7 that quick printing and liquid-level smoothing can be effectively achieved.

Figure 12:
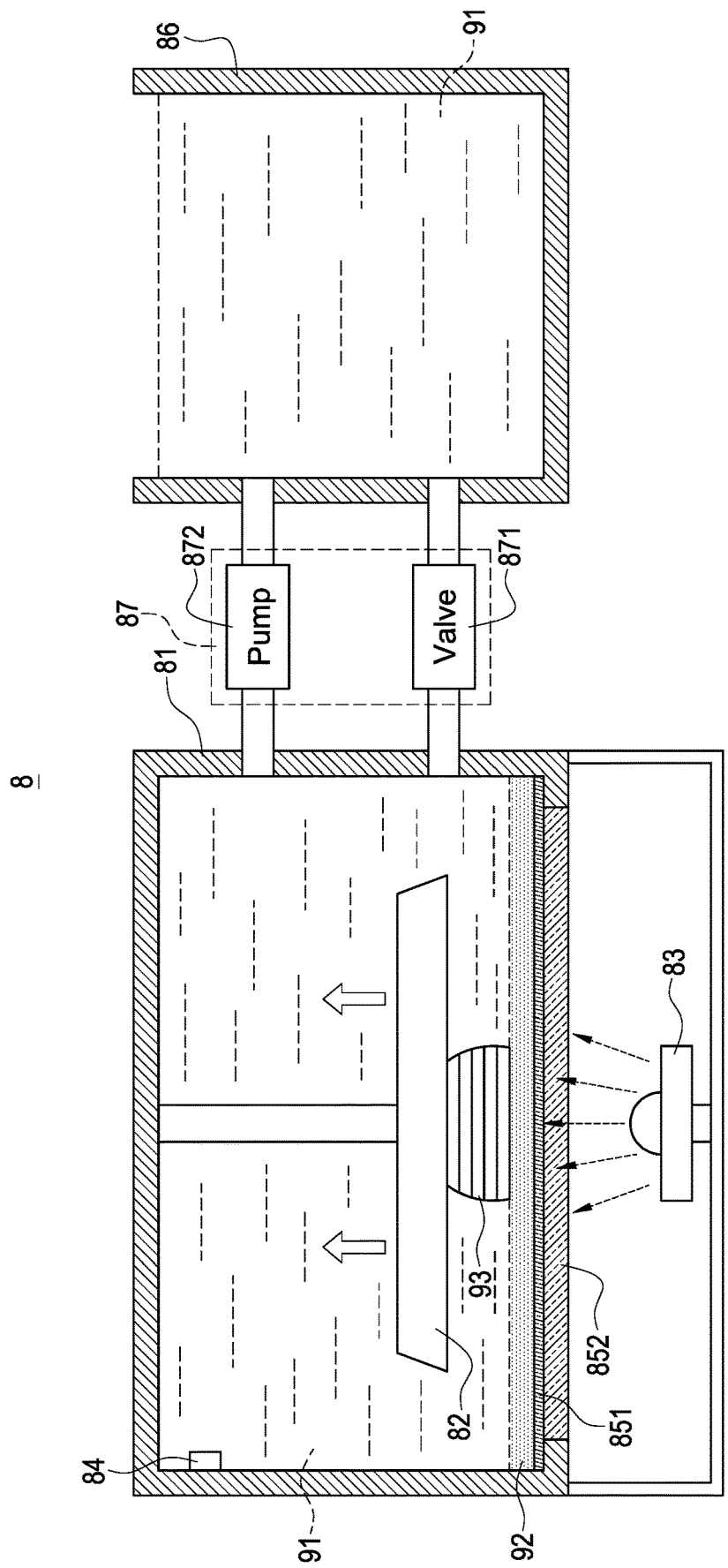
FIG. 12 is a schematic diagram of the 3D printer of a fourth embodiment according to the present invention.

FIG. 12 is a schematic diagram of the 3D printer of a fourth embodiment according to the present invention. FIG. 12 discloses another light-curing 3D printer (referred to as the 3D printer 8 hereinafter). The difference between the 3D printer 8 and the 3D printer 7 shown in FIG. 9 is that the 3D printer 8 in FIG. 12 is an upside-down style light-curing 3D printer.

As shown in FIG. 12, the 3D printer 8 includes a main-tank 81, a printing platform 82, a lighting unit 83, a sensing unit 84, a membrane 851, a first sub-tank 86, an auxiliary mechanism 87 involving a valve 871 and a pump 872, a processor and a storage similar to the processor 30 and the storage 38 (not shown) as discussed with respect to FIG. 5.

The aforementioned main-tank 81, the printing platform 82, the lighting unit 83, the sensing unit 84, the membrane 851, the first sub-tank 86, the valve 871, and the pump 872 are similar to the main-tank 31, the printing platform 32, the lighting unit 33, the sensing unit 34, the membrane 35, the first sub-tank 36, the valve 371, and the pump 372 as discussed with respect to FIG. 9, the detailed description is omitted. The following description will be taken place with respect to the difference between the 3D printer 8 and the 3D printer 7 associated to another embodiment.

As shown in FIG. 12, the main-tank 81 has a containing space for containing a liquid material 91 and an isolation fluid 92. In this embodiment, the specific weight of the isolation fluid 92 is bigger than the specific weight of the liquid material 91, and the isolation fluid 92 is set precipitating below the liquid material 91. The membrane 851 is arranged beneath the isolation fluid 92. The 3D printer 8 form a sealed space inside the main-tank 81 through the arrangement of the membrane 851.

In the embodiment, the bottom of the main-tank 81 is a glass substrate 852 for supporting the membrane 851, the isolation fluid 92, and the liquid material 91.

The printing platform 82 is arranged in the main-tank 81, and the printing platform 82 is controlled by the processor to immerse into the liquid material 91. The lighting unit 83 is arranged under the printing platform 82, and the lighting unit 83 is controlled by the processor to emit light toward the printing platform 82.

The first sub-tank 86 is similar to the first sub-tank 36 disclosed in FIG. 9, which is used for containing the liquid material 91. The valve 871 is similar to the valve 371 disclosed in FIG. 9, which connects one side of the main-tank 81 and one side of the first sub-tank 86 for communicating the main-tank 81 to the first sub-tank 86. The pump 872 is similar to the pump 372 disclosed in FIG. 9, which connects one side of the main-tank 81 and one side of the first sub-tank 86 for communicating the main-tank 81 to the first sub-tank 86.

The contact part of the pump 872 and the main-tank 81 can be arranged at one side near the top of the main-tank 81 (i.e., far from the surface of the printing platform 82), but not limited thereto.

In this embodiment, the processor controls the lighting unit 83 to emit light toward the printing platform 82 after the equalization of pressure between the main-tank 81 and the first sub-tank 86 is reached and the pump 872 is turned off, so as to form a 3D object 93 of one cured-layer. After the 3D object 93 is formed, the processor closes the valve 871, and then controls the printing platform 82 to rise to a required height of next cured-layer as well as activating the pump 872 to pressurize the main-tank 81.

When determining that the internal pressure of the main-tank 81 reaches an expected value, the processor controls the pump 872 to stop pressurizing the main-tank 81. Next, the processor opens the valve 871, so the main-tank 81 may release its internal pressure toward the first sub-tank 86 and the main-tank 81 and the first sub-tank 86 may eventually reach the equalization of pressure. After the equalization of pressure between the main-tank 81 and the first sub-tank 86 is reached, the liquid-level of the liquid material 91 in the main-tank 81 should become smooth and the isolation fluid 92 in the main-tank 81 should stops being shaken, therefore, the processor may control the lighting unit 83 to proceed the curing action for next cured-layer, until the whole 3D model is completely formed.

As discussed above, the technical solution disclosed in the present invention may be applied for different types of light-curing 3D printers, and in particularly for both bottom-up style 3D printers and upside-down style 3D printers, which weights values in the market.

As the skilled person will appreciate, various changes and modifications can be made to the described embodiment. It is intended to include all such variations, modifications and equivalents which fall within the scope of the present invention, as defined in the accompanying claims.

What is claimed is:

1. A light-curing 3D printer capable of quick printing and liquid-level smoothing, comprising:
   a main-tank for containing a liquid material and an isolation fluid, wherein a specific weight of the isolation fluid is smaller than a specific weight of the liquid material, and the isolation fluid is set floating upon the liquid material;
   a membrane arranged above the isolation fluid and covering the main-tank;
   a printing platform arranged in the main-tank and controlled to immerse in the liquid material;
   a lighting unit arranged above the printing platform;
   an auxiliary mechanism, comprising a pump and two valves respectively arranged on a wall of two sides of the main-tank;
   a sub-tank, configured to contain the isolation fluid;
   two sets of isolation fluid pipe, one end of the two sets of isolation fluid pipe respectively arranged in the sub-tank, another end of the two sets of isolation fluid pipe respectively connected to the two valves on the main-tank; and
   a processor electrically connected to the printing platform, the lighting unit, and the auxiliary mechanism, wherein the processor controls the lighting unit to emit light toward the printing platform to cure a part of the liquid material for forming a 3D object of a cured-layer on the printing platform;
   wherein, the processor controls the printing platform to lower to a certain height for a next cured-layer after the 3D object of the cured-layer is formed, and controls the auxiliary mechanism to provide an auxiliary manner to inside of the main-tank for continually flowing or shaking the isolation fluid in the main-tank, wherein the auxiliary manner involves opening the two valves and activating the pump for the isolation fluid being forced to continually flow between the main-tank and the sub-tank through the two sets of isolation fluid pipe.

2. The light-curing 3D printer in claim 1, wherein the isolation fluid is an isolation liquid or an isolation gas.

3. The light-curing 3D printer in claim 1, wherein the isolation fluid flows between the main-tank and the sub-tank in a laminar flow state.

4. The light-curing 3D printer in claim 1, wherein a height of the two valves arranged on the main-tank is corresponding to height of the isolation fluid floating in the main-tank.

5. A light-curing 3D printer capable of printing and liquid-level smoothing, comprising:
   a main-tank for containing a liquid material and an isolation fluid, wherein a specific weight of the isolation fluid is smaller than a specific weight of the liquid material, and the isolation fluid is set floating upon the liquid material;
   a membrane arranged above the isolation fluid and covering the main-tank;
   a printing platform arranged in the main-tank and controlled to immerse in the liquid material;
   a lighting unit arranged above the printing platform;
   an auxiliary mechanism;
   a first sub-tank for containing the isolation fluid; and
   a processor electrically connected to the printing platform, the lighting unit, and the auxiliary mechanism, controlling the auxiliary mechanism to provide an auxiliary manner for the isolation fluid to continually flow between the main-tank and the first sub-tank;
   wherein the processor controls the lighting unit to emit light toward the printing platform while performing a printing procedure to cure a part of the liquid material for forming a 3D object of a cured-layer on the printing platform, and controls the printing platform to lower to a certain height of a next cured-layer after the 3D object of the cured-layer is formed for proceeding a curing action of the next cured-layer.

6. The light-curing 3D printer in claim 5, wherein the isolation fluid is mixable with the liquid material.

7. The light-curing 3D printer in claim 5, wherein the auxiliary mechanism comprises a first pump and two isolation fluid valves arranged on a wall of two sides of the main-tank, and the light-curing 3D printer further comprises two sets of isolation fluid pipe, one end of the two sets of isolation fluid pipe is arranged in the first sub-tank, another end of the two sets of isolation fluid pipe is respectively connected to the two isolation fluid valves on the main-tank, wherein the auxiliary manner involves opening the two isolation fluid valves and activating the first pump for the isolation fluid to continually flow between the main-tank and the first sub-tank through the two sets of isolation fluid pipe.

8. The light-curing 3D printer in claim 7, wherein the auxiliary mechanism further comprises a second pump and two liquid material valves arranged on the wall of two sides of the main-tank, the light-curing 3D printer further comprises a second sub-tank and two sets of liquid material pipe, the second sub-tank is containing the liquid material, one end of the two sets of liquid material pipe is arranged in the second sub-tank, another end of the two sets of liquid material pipe is respectively connected to the two liquid material valves on the main-tank, wherein the auxiliary manner involves opening the two liquid material valves and activating the second pump while the printing platform is declining, so the liquid material is forced to continually flow between the main-tank and the second sub-tank through the two sets of liquid material pipe.

9. The light-curing 3D printer in claim 8, wherein a flowing speed of the liquid material is same as a flowing speed of the isolation fluid when a flowing direction of the liquid material is same as a flowing direction of the isolation fluid, and the flowing speed of the liquid material is identical to or different from the flowing speed of the isolation fluid when the flowing direction of the liquid material is different from the flowing direction of the isolation fluid.

10. The light-curing 3D printer in claim 8, wherein a height of the two isolation fluid valves arranged on the main-tank is corresponding to a height of the isolation fluid floating in the main-tank, and a height of the two liquid material valves arranged on the main-tank is corresponding to a height of an liquid-level of the liquid material in the main-tank.

11. The light-during 3D printer in claim 8, wherein the processor closes the two liquid material valves and turns the second pump off for the liquid material to stop flowing before controlling the lighting unit to emit light.

* * * * *